US012568495B2

(12) United States Patent
Liu et al.

(10) Patent No.: US 12,568,495 B2
(45) Date of Patent: Mar. 3, 2026

(54) SHORT SIGNALING TRANSMISSION FOR SIDELINK COMMUNICATION IN UNLICENSED SPECTRUM

(71) Applicant: Nokia Technologies Oy, Espoo (FI)

(72) Inventors: Yong Liu, Shanghai (CN); Tao Tao, Shanghai (CN); Naizheng Zheng, Beijing (CN); Dong Li, Shanghai (CN)

(73) Assignee: Nokia Technologies Oy, Espoo (FI)

( * ) Notice: Subject to any disclaimer, the term of this patent is extended or adjusted under 35 U.S.C. 154(b) by 305 days.

(21) Appl. No.: 18/560,468

(22) PCT Filed: Jun. 1, 2021

(86) PCT No.: PCT/CN2021/097621
§ 371 (c)(1),
(2) Date: Nov. 13, 2023

(87) PCT Pub. No.: WO2022/252109
PCT Pub. Date: Dec. 8, 2022

(65) Prior Publication Data
US 2024/0251410 A1 Jul. 25, 2024

(51) Int. Cl.
*H04W 72/20* (2023.01)
*H04W 74/0808* (2024.01)

(52) U.S. Cl.
CPC ....... *H04W 72/20* (2023.01); *H04W 74/0808* (2013.01)

(58) Field of Classification Search
CPC .......................... H04W 72/20; H04W 74/0808
See application file for complete search history.

(56) References Cited

U.S. PATENT DOCUMENTS

| | | | |
|---|---|---|---|
| 12,250,721 B2 * | 3/2025 | Chisci .............. | H04W 74/0808 |
| 2018/0279300 A1 | 9/2018 | Yang et al. | |

(Continued)

FOREIGN PATENT DOCUMENTS

| | | |
|---|---|---|
| CN | 105592478 A | 5/2016 |
| CN | 108781149 A | 11/2018 |
| WO | 2020/198701 A1 | 10/2020 |

OTHER PUBLICATIONS

IEEE 802.11, Wikipedia, Retrieved on Nov. 4, 2023, Webpage available at : https://en.wikipedia.org/wiki/IEEE_802.11.

(Continued)

*Primary Examiner* — Abdullah A Riyami
(74) *Attorney, Agent, or Firm* — Nokia Technologies Oy

(57) ABSTRACT

Embodiments of the present disclosure relate to a short control signaling transmission for sidelink communication in an unlicensed spectrum. According to one aspect of the present disclosure, if a control signaling is to be transmitted to a second device via a short control signaling transmission, a first device determines whether the short control signaling transmission is available based on at least information related to a counter, the counter being used for counting occasions within a period for the short control signaling transmission at a sidelink interface. If the short control signaling transmission is available, the first device transmits the control signaling to the second device on a first resource configured for the short control signaling transmission. In this way, constraints for the usage of the short control signaling transmission can be satisfied, and a reliable transmission of sidelink control signaling in the unlicensed spectrum can be achieved.

20 Claims, 10 Drawing Sheets

(56) References Cited

U.S. PATENT DOCUMENTS

| | | | |
|---|---|---|---|
| 2018/0368090 A1 * | 12/2018 | Kadambar | ............ H04W 8/005 |
| 2021/0014891 A1 | 1/2021 | Talarico et al. | |
| 2021/0029731 A1 | 1/2021 | Kundu et al. | |

OTHER PUBLICATIONS

International Search Report and Written Opinion received for corresponding Patent Cooperation Treaty Application No. PCT/CN2021/097621, dated Feb. 28, 2022, 9 pages.
"Channel access mechanism for 60 GHz unlicensed spectrum", 3GPP TSG RAN WG1 #104bis-e, R1-2103299, Agenda Item: 8.2.6, Sony, Apr. 12-20, 2021, 7 pages.
Office action received for corresponding Chinese Patent Application No. 202180005662.6, dated Nov. 3, 2025, 14 pages of office action and 10 pages of translation available.

* cited by examiner

600

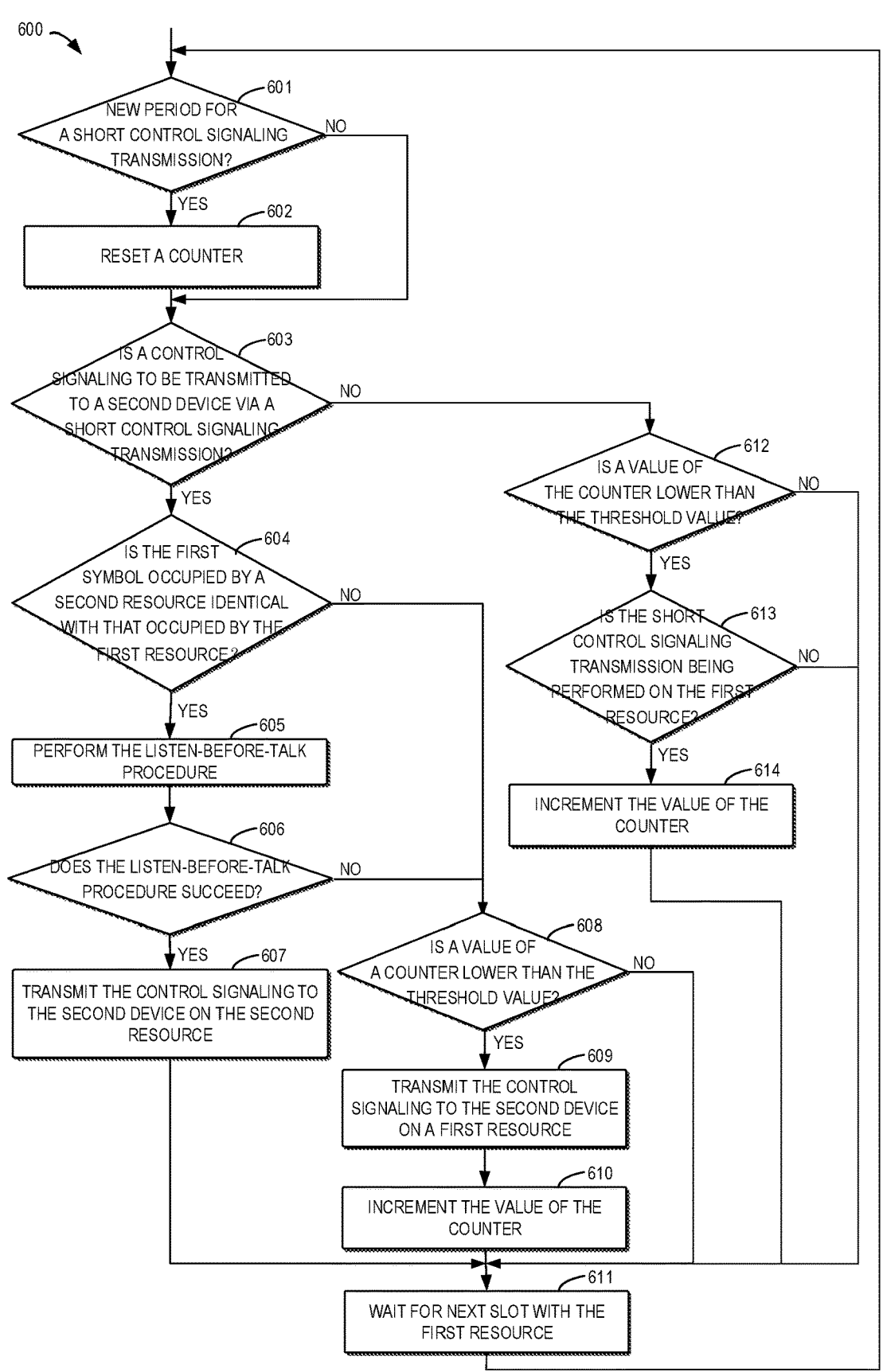

601
NEW PERIOD FOR A SHORT CONTROL SIGNALING TRANSMISSION?
NO

YES

602
RESET A COUNTER

603
IS A CONTROL SIGNALING TO BE TRANSMITTED TO A SECOND DEVICE VIA A SHORT CONTROL SIGNALING TRANSMISSION?
NO

YES

604
IS THE FIRST SYMBOL OCCUPIED BY A SECOND RESOURCE IDENTICAL WITH THAT OCCUPIED BY THE FIRST RESOURCE?
NO

YES

605
PERFORM THE LISTEN-BEFORE-TALK PROCEDURE

606
DOES THE LISTEN-BEFORE-TALK PROCEDURE SUCCEED?
NO

YES     607
TRANSMIT THE CONTROL SIGNALING TO THE SECOND DEVICE ON THE SECOND RESOURCE

612
IS A VALUE OF THE COUNTER LOWER THAN THE THRESHOLD VALUE?
NO

YES

613
IS THE SHORT CONTROL SIGNALING TRANSMISSION BEING PERFORMED ON THE FIRST RESOURCE?
NO

YES     614
INCREMENT THE VALUE OF THE COUNTER

608
IS A VALUE OF A COUNTER LOWER THAN THE THRESHOLD VALUE?
NO

YES     609
TRANSMIT THE CONTROL SIGNALING TO THE SECOND DEVICE ON A FIRST RESOURCE

610
INCREMENT THE VALUE OF THE COUNTER

611
WAIT FOR NEXT SLOT WITH THE FIRST RESOURCE

Figures 8, 9, 10:
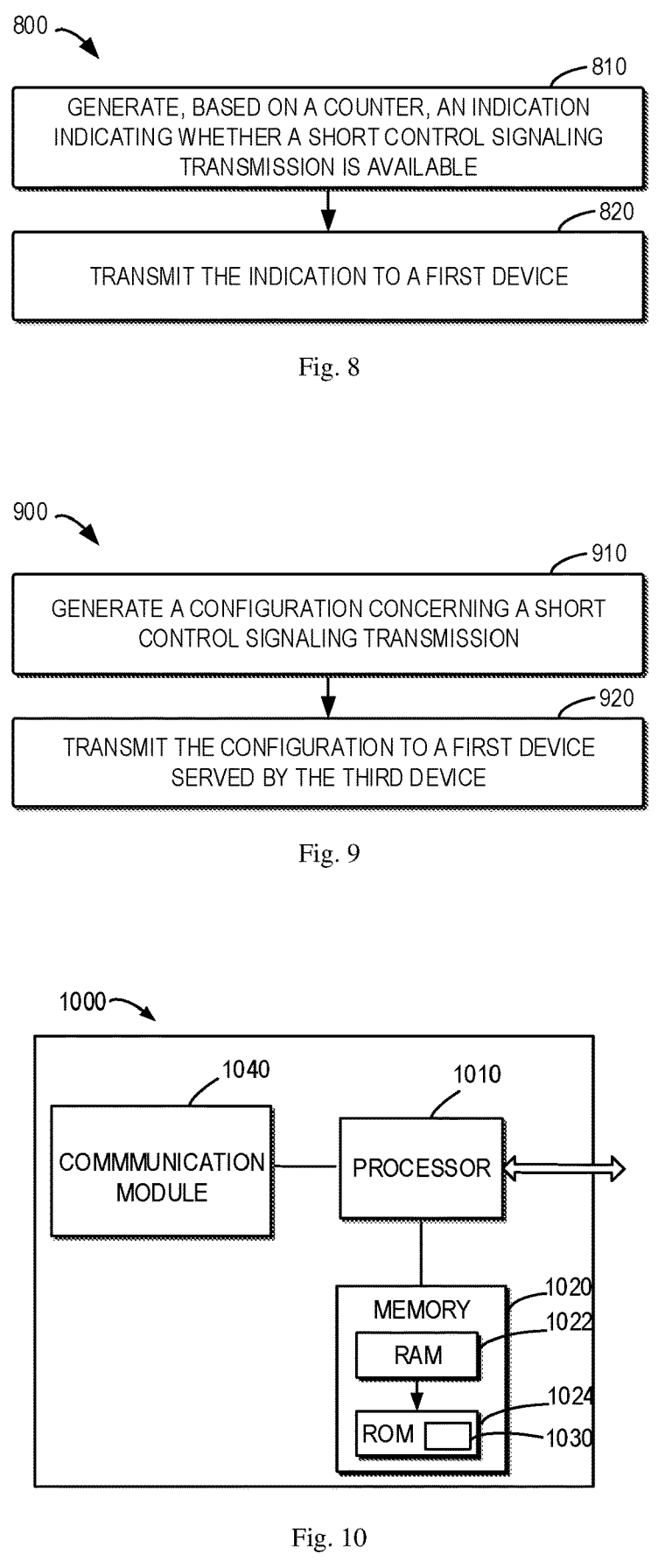

GENERATE, BASED ON A COUNTER, AN INDICATION INDICATING WHETHER A SHORT CONTROL SIGNALING TRANSMISSION IS AVAILABLE

820

TRANSMIT THE INDICATION TO A FIRST DEVICE

GENERATE A CONFIGURATION CONCERNING A SHORT CONTROL SIGNALING TRANSMISSION

920

TRANSMIT THE CONFIGURATION TO A FIRST DEVICE SERVED BY THE THIRD DEVICE

COMMMUNICATION MODULE

PROCESSOR

MEMORY

1020

RAM

1022

ROM

SHORT SIGNALING TRANSMISSION FOR SIDELINK COMMUNICATION IN UNLICENSED SPECTRUM

RELATED APPLICATION

This application was originally filed as PCT Application No. PCT/CN2021/097621, filed on Jun. 1, 2021, which is incorporated herein by reference in its entirety.

FIELD

Embodiments of the present disclosure generally relate to the field of telecommunication and in particular, to a method, device, apparatus and computer readable storage medium for a short control signaling transmission (SCST) for a sidelink communication in an unlicensed spectrum.

BACKGROUND

In an unlicensed spectrum, channel access relies on a listen-before-talk (LBT) procedure to ensure fair coexistence of different wireless communication systems. LBT uncertainty in the unlicensed spectrum may substantially reduce an efficiency of the sidelink communication. However, reliable transmission of a sidelink control channel such as a physical sidelink feedback channel (PSFCH) for hydride automatic repeat request (HARQ) feedback is critical to avoid unnecessary transmission or retransmission of much larger sidelink data channels such as a physical sidelink shared channel (PSSCH).

A SCST is specified for communication in the unlicensed spectrum. The SCST is a transmission used by user equipment (UE) to send management and control frames without sensing a channel for the presence of other signals. Thus, it is expected to apply the SCST for the sidelink communication (in particular, the sidelink control channel) in the unlicensed spectrum.

SUMMARY

In general, example embodiments of the present disclosure provide a solution for a SCST for a sidelink communication in an unlicensed spectrum.

In a first aspect, there is provided a first device. The first device comprises at least one processor; and at least one memory including computer program code; the at least one memory and the computer program code are configured to, with the at least one processor, cause the first device to: in accordance with a determination that a control signaling is to be transmitted to a second device via a SCST, determine whether the SCST is available based on at least information related to a counter, the counter being used for counting occasions within a period for the SCST at a sidelink interface; and in accordance with a determination that the SCST is available, transmit the control signaling to the second device on a first resource, the first resource being configured for the SCST.

In a second aspect, there is provided a third device. The third device comprises at least one processor; and at least one memory including computer program code; the at least one memory and the computer program code are configured to, with the at least one processor, cause the third device to: generate, based on a counter, an indication indicating whether a SCST is available, the counter being used for counting occasions within a period for the SCST at a sidelink interface; and transmit the indication to a first device served by the third device.

In a third aspect, there is provided a third device. The third device comprises at least one processor; and at least one memory including computer program code; the at least one memory and the computer program code are configured to, with the at least one processor, cause the third device to: generate a configuration concerning a SCST, the configuration comprising at least one of the following: first information indicating a first resource, the first resource being configured for the SCST, second information indicating the usage of the first resource, or third information indicating a counter, the counter being used for counting occasions within a period for the SCST at a sidelink interface; and transmit the configuration to a first device served by the third device.

In a fourth aspect, there is provided a method for communication. The method comprises: in accordance with a determination that a control signaling is to be transmitted to a second device via a SCST, determining, at a first device, whether the SCST is available based on at least information related to a counter, the counter being used for counting occasions within a period for the SCST at a sidelink interface; and in accordance with a determination that the SCST is available, transmitting the control signaling to the second device on a first resource, the first resource being configured for the SCST.

In a fifth aspect, there is provided a method for communication. The method comprises: generating, at a third device and based on a counter, an indication indicating whether a SCST is available, the counter being used for counting occasions within a period for the SCST at a sidelink interface; and transmitting the indication to a first device served by the third device.

In a sixth aspect, there is provided a method for communication. The method comprises: generating, at a third device, a configuration of a counter, the counter being used for counting occasions within a period for the SCST at a sidelink interface; and transmitting the configuration to a first device served by the third device.

In a seventh aspect, there is provided a non-transitory computer readable medium comprising program instructions for causing an apparatus to perform the method according to the above fourth, fifth or sixth aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where:

FIG. 6 illustrates a flowchart of another method implemented at a first device according to some embodiments of the present disclosure;

FIG. 8 illustrates a flowchart of a method implemented at a third device according to some embodiments of the present disclosure;

FIG. 9 illustrates a flowchart of another method implemented at a third device according to some embodiments of the present disclosure;

FIG. 10 illustrates a simplified block diagram of an apparatus that is suitable for implementing embodiments of the present disclosure.

Throughout the drawings, the same or similar reference numerals represent the same or similar element.

DETAILED DESCRIPTION

Figure 1:
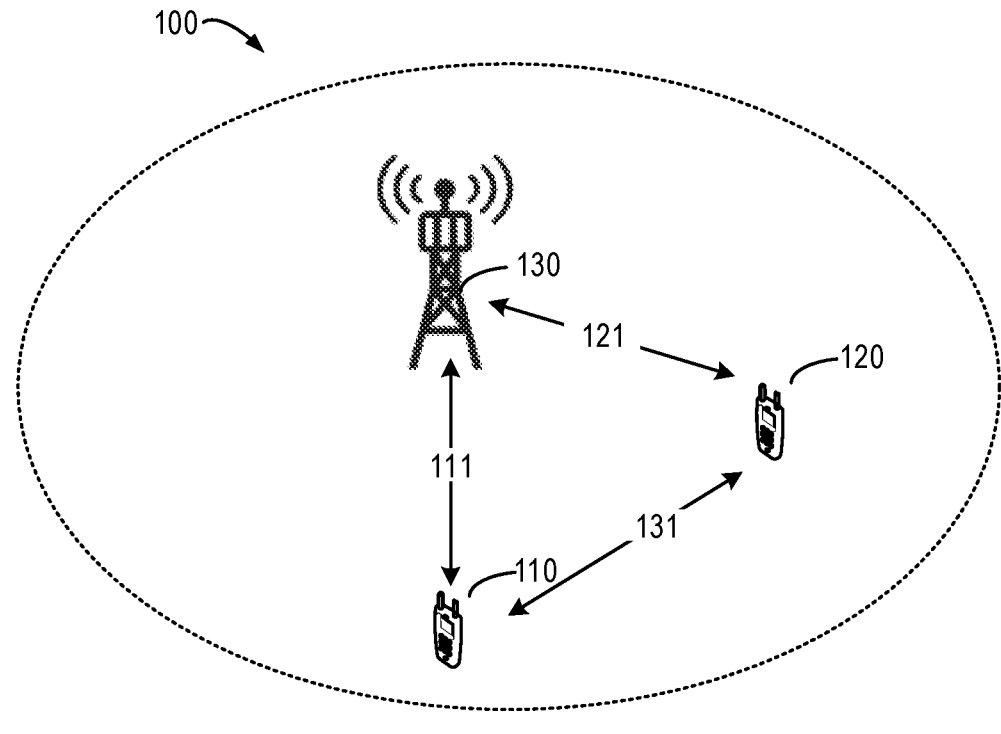
FIG. 1 illustrates an example communication network in which embodiments of the present disclosure may be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR next generation NodeB (also referred to as a gNB), a Remote Radio Unit (RRU), a radio header (RH), a remote radio head (RRH), a relay, a low power node such as a femto, a pico, and so forth, depending on the applied terminology and technology. An RAN split architecture comprises a gNB-CU (Centralized unit, hosting RRC, SDAP and PDCP) controlling a plurality of gNB-DUs (Distributed unit, hosting RLC, MAC and PHY).

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VOIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

Although functionalities described herein can be performed, in various example embodiments, in a fixed and/or a wireless network node, in other example embodiments, functionalities may be implemented in a user equipment apparatus (such as a cell phone or tablet computer or laptop computer or desktop computer or mobile IoT device or fixed IoT device). This user equipment apparatus can, for example, be furnished with corresponding capabilities as described in connection with the fixed and/or the wireless network node(s), as appropriate. The user equipment apparatus may be the user equipment and/or or a control device, such as a chipset or processor, configured to control the user equipment when installed therein. Examples of such functionalities include the bootstrapping server function and/or the home subscriber server, which may be implemented in the user equipment apparatus by providing the user equipment apparatus with software configured to cause the user equipment apparatus to perform from the point of view of these functions/nodes.

As mentioned above, reliable transmission of a sidelink control channel in an unlicensed spectrum is critical. Thus, it is expected to apply a SCST for the sidelink control channel in the unlicensed spectrum, so as to better realize the sidelink communication in the unlicensed spectrum.

Generally, the use of the SCST is constrained as follows:
within an observation period of 50 ms, the number of SCSTs by UE shall be equal to or less than 50; and the total duration of the UE's SCST shall be less than 2500 us within said observation period.

In view of the above, embodiments of the present disclosure provide a counter based mechanism for a SCST at a sidelink interface. In this mechanism, excessive or sufficient resources are configured for the SCST and a counter is set for counting occasions within a period for the SCST at the sidelink interface. In this way, the above constraints for the usage of the SCST can be satisfied and then a reliable transmission of the sidelink control channel in the unlicensed spectrum can be achieved by mean of the SCST. Principles and implementations of the present disclosure will be described in detail below with reference to the figures.

Example of Communication Network

FIG. 1 illustrates a schematic diagram of an example communication network 100 in which embodiments of the present disclosure can be implemented. As shown in FIG. 1, the communication network 100 may involve a first device 110, a second device 120 and a third device 130 that can communicate with each other. In this example, the first device 110 and the second device 120 are illustrated as terminal devices, and the third device 130 is illustrated as a network device serving the terminal devices. Thus, the serving area of the third device 130 is called as a cell as shown in dash line.

It is to be understood that the number of network devices and terminal devices is only for the purpose of illustration without suggesting any limitations. The communication network 100 may include any suitable number of network devices and terminal devices adapted for implementing embodiments of the present disclosure. Although not shown, it would be appreciated that more terminal devices may be located in the cell and served by the third device 130. Further, although the first device 110 and the second device 120 are illustrated as the terminal devices, and the third device 130 is illustrated as the network device, any of the first device 110 and the second device 120 may be in a form of network devices, and the third device 130 may be in a form of a terminal device. The present disclosure does not limit this aspect.

As shown in FIG. 1, the third device 130 may communicate with the first and second devices 110 and 120 via channels (such as, wireless communication channels) 111 and 121, respectively. In the case where the first and second devices 110 and 120 are the terminal devices and the third device 130 is the network device, the channels 111 and 121 may be a physical uplink control channel (PUCCH) or physical uplink share channel (PUSCH) in a link from the first and second device 110 and 120 to the third device 130 or a physical downlink control channel (PDCCH) or physical downlink share channel (PDSCH) in a link from the third device 130 to the first and second device 110 and 120.

The first and second devices 110 and 120 are shown in FIG. 1 as mobile phones which enable sidelink communications. It is to be understood that embodiments of the present disclosure are also applicable to other devices than mobile phones, such as vehicles, sensors and so on. The first device 110 may communicate with the second device 120 via a sidelink channel 131. The sidelink channel 131 may be a sidelink control channel such as PSCCH or PSFCH, or a sidelink data channel such as a physical sidelink shared channel (PSSCH).

Communications in the communication network 100 may be implemented according to any proper communication protocol(s), comprising, but not limited to, cellular communication protocols of the first generation (1G), the second generation (2G), the third generation (3G), the fourth gen-
eration (4G) and the fifth generation (5G) and on the like,
wireless local network communication protocols such as
Institute for Electrical and Electronics Engineers (IEEE)
802.11 and the like, and/or any other protocols currently
known or to be developed in the future. Moreover, the
communication may utilize any proper wireless communi-
cation technology, comprising but not limited to: Code
Division Multiple Access (CDMA), Frequency Division
Multiple Access (FDMA), Time Division Multiple Access
(TDMA), Frequency Division Duplex (FDD), Time Divi-
sion Duplex (TDD), Multiple-Input Multiple-Output
(MIMO), Orthogonal Frequency Division Multiple
(OFDM), Discrete Fourier Transform spread OFDM (DFT-
s-OFDM) and/or any other technologies currently known or
to be developed in the future.

The communication network 100 may be operated in an
unlicensed spectrum together with other communication
networks such as a WiFi network. In some scenarios, the first
device 110 may transmit a control signaling to the second
device 120 via a sidelink control channel in an unlicensed
spectrum. For example, the first device 110 may transmit a
HARQ feedback for a PSSCH to the second device 120 via
a PSFCH.

Figure 2A:
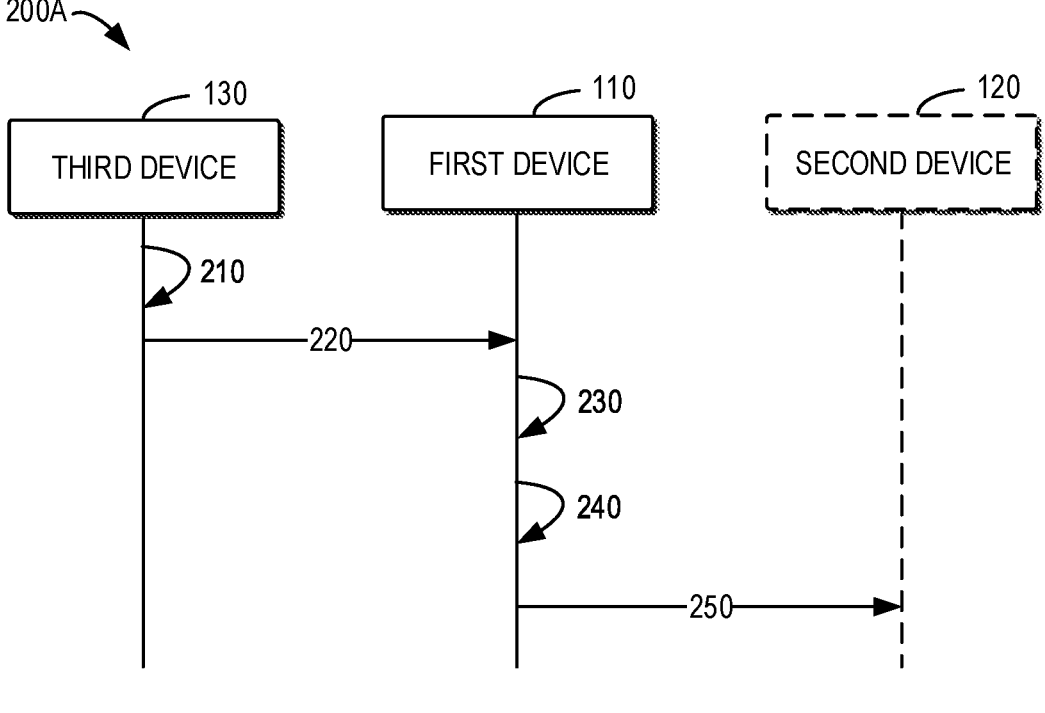
FIG. 2A illustrates a flowchart illustrating a process of a SCST for a sidelink communication in an unlicensed spectrum according to some embodiments of the present disclosure.

Embodiments of the present disclosure provide a solution
for a SCST for a sidelink in an unlicensed spectrum. In this
solution, a counter is set for counting occasions within a
period for a SCST, and excessive or sufficient resources are
configured for the SCST. If a control signaling is to be
transmitted via the SCST at a sidelink interface, a determination on whether the SCST is available is made based on
at least information related to the counter. If the SCST is
available, the control signaling is transmitted on a resource
configured for the SCST. More details will be described
below in connection with FIGS. 2 to 4.
Example Implementation of Sidelink SCST in Unlicensed
Spectrum FIG. 2A illustrates a flowchart illustrating a process 200A
of a SCST for a sidelink communication in an unlicensed
spectrum according to some embodiments of the present
disclosure. For the purpose of discussion, the process 200A
will be described with reference to FIG. 1. The process 200A
may involve the first, second and third devices 110, 120 and
130 as illustrated in FIG. 1. It would be appreciated that
although the process 200A has been described in the communication network 100 of FIG. 1, this process may be
likewise applied to other communication scenarios where
different network devices are jointly deployed to provide
respective serving cells.
Example Configuration for SCST As shown in FIG. 2A, the third device 130 generates 210 a configuration concerning a SCST. This will be described in
connection with the following items 1-3.
1. Configuration of Resource In some embodiments, the configuration may comprise
information (for convenience, also referred to as first infor-
mation herein) indicating a resource (for convenience, also
referred to as a first resource or SCST resource herein)
configured for the SCST. For example, the first information
may comprise a time or frequency location of the SCST
resource. As another example, the first information may
comprise a granularity of the SCST resource.

Since a short control signal is used for management and
control frames, it is suitable to multiplex the SCST resource
with other sidelink resources, especially other resources for
control channels (e.g., PSFCHs). In some alternative
embodiments, the third device 130 may multiplex the SCST resource with other sidelink resources by a code division
multiplexing (CDM). In some embodiments, the third device
130 may multiplex the SCST resource with other sidelink
resources by a frequency division multiplexing (FDM). This
will be detailed below with reference to FIG. 2B.

Figure 2B:
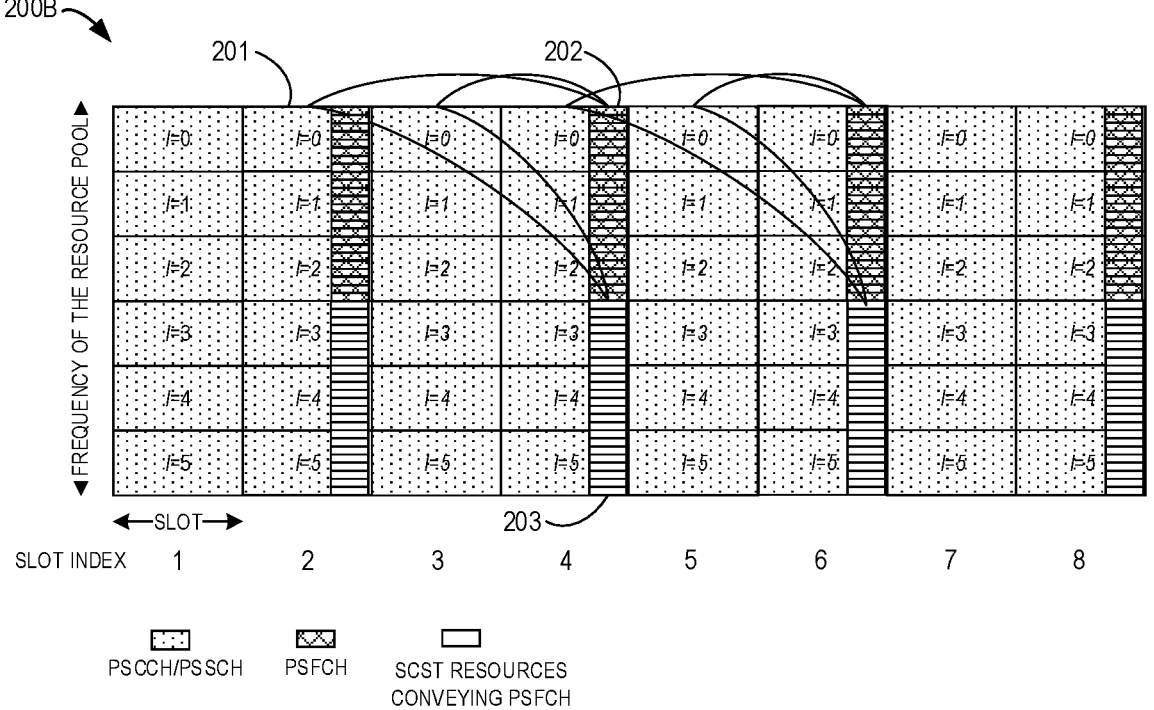
FIG. 2B illustrates a diagram illustrating time and frequency resources for a sidelink communication according to some embodiments of the present disclosure.

FIG. 2B illustrates a diagram 200B illustrating time and
frequency resources for a sidelink communication according
to some embodiments of the present disclosure. In this
example, SCST resources for HARQ feedback for PSSCHs
are configured to be frequency-division multiplexed with
normal PSFCH resources. As shown in FIG. 2B, SCST
resources are in the same slots as normal PSFCH resources,
and SCST resources are periodic with the same period as
normal PSFCH resources.

In some embodiments, each SCST resource may be
configured to occupy 1 physical resource block (PRB). In
this case, the existing design of PSFCH for HARQ feedback
can be directly reused. For example, at each SCST resource,
a Zadoff-Chu sequence of length 12 may be transmitted,
which conveys HARQ feedback information such as an
acknowledgement (ACK) or a non-acknowledgement
(NACK). Of course, any other suitable sequences are also
feasible.

In some alternative embodiments, each SCST resource
may be configured to occupy more than 1 PRB, e.g., 2 or 3
PRBs. In this case, the existing design of PSFCH for HARQ
feedback needs to be extended. For example, at each SCST
resource, a Zadoff-Chu sequence of longer length, e.g. 24 or
36, which makes transmission of ACK/NACK feedback
more robust to combat external interference. Of course, any
other suitable sequences are also feasible.
2. Configuration of Usage of Resource In some additional or alternative embodiments, the con-
figuration may comprise information (for convenience, also
referred to as second information herein) indicating the
usage of the SCST resource, that is, how to use the SCST
resource. For example, the second information may com-
prise a mapping between a data channel and the SCST
resource. In this way, the third device 130 can configure
which equipment uses a SCST resource and accordingly the
equipment can know which SCST resource it should use.

In some embodiments, the third device 130 may further
configure a resource (for convenience, also referred to as a
second resource or normal resource herein) which needs
LBT for channel access so that the normal resource is
associated with the same control signaling as the SCST
resource. In this case, the first symbol occupied by the
normal resource may be identical with that occupied by the
SCST resource. For example, the normal resource and the
SCST resource may be multiplexed by FDM or CDM.

In this embodiment, similar as normal PSFCH resources,
SCST resources (time or frequency or code) for HARQ
feedback are associated with PSSCHs (time or frequency).
As an example shown in FIG. 2B, a HARQ feedback for a
PSSCH 201 on slot 2 is associated with a normal PSFCH
resource 202 and a SCST resource 203 on slot 4. That is, the
SCST resource 203 and the normal PSFCH resource 202 are
associated with the same PSSCH 201. The SCST resource
203 has a frequency offset to the normal PSFCH resource
202. In this case, the first device 110 which receives the
PSSCH 201 can use the SCST resource 203 associated with
the PSSCH 201.

The second information for the usage of the SCST
resources makes sure that existence of SCST is identifiable
at sidelink UEs. If SCST resources are dedicated, UEs can
use energy detection to identify existence of SCST. Further, if SCST employs sequence, UEs can use sequence detection to identify existence of SCST more reliably.

3. Configuration of Counter

It should be noted that whether SCST resources in a slot are actually used depends on whether there are external systems transmitting, which is unpredictable. Thus, the amount of configured SCST resources is usually larger than specification limits. In this case, only a part of configured SCST resources can be actually used for transmission. Thus, counter based mechanism is needed to limit the use of configured SCST resources for transmission. The counter is used to count the number of used SCST occasions. In some additional or alternative embodiments, the configuration may comprise information (for convenience, also referred to as third information herein) indicating the counter. In other words, the third device 130 may configure the counter to limit the usage of the SCST resources.

In some additional or alternative embodiments, the configuration may comprise information (for convenience, also referred to as third information herein) indicating the counter. In some embodiments where configured SCST resources are periodic, the third information may comprise a length of the period. For example, the period may be set as 100 slots. This is merely an example, and the period may also be set as any other suitable values.

In some embodiments, the third information may comprise a starting slot of the period. For example, slot 1. This is merely an example, and the starting slot may be selected in any suitable ways.

In some embodiments, the third information may comprise a threshold value for the number of the SCST occasions in the period. In the example of FIG. 2B, the period of the counter is assumed to be 100 ms. As a time length of a symbol is 66.7 μs, the threshold value T may be calculated as 37 according to equation (1) below so as to satisfy the constraints for the SCST.

$$T = [2500 \ us * 2/66.7 * 2 \ us)] = 37 \tag{1}$$

It should be noted that equation (1) is merely an example, and any other suitable ways are also feasible to determine the threshold value T.

Return to FIG. 2A, upon generation of the configuration concerning the SCST, the third device 130 transmits 220 the configuration to the first device 110. In some embodiments, the third device 130 may broadcast the configuration to a plurality of first devices. Of course, the third device 130 may generate the configuration dedicated for the first device 110 and transmit the dedicated configuration to the first device 110. The present disclosure does not limit this aspect.

Example Implementation for SCST

With reference to FIG. 2A, the first device 110 determines 230 whether a control signaling is to be transmitted to the second device 120 via a SCST. If determining that the control signaling is to be transmitted via the SCST, the first device 110 determines 240 whether the SCST is available based on at least information related to the counter.

In some embodiments, the counter may be maintained by the first device 110. In this case, the information related to the counter may comprise a value of the counter and a threshold value set for the counter. Of course, any other suitable information related to the counter is also feasible. In these embodiments, the first device 110 may determine that the SCST is available if the value of the counter is lower than the threshold value, and determine that the SCST is unavailable if the value of the counter is equal to or higher than the threshold value.

In some alternative embodiments, the counter may be maintained by the third device 130. In this case, the information related to the counter may comprise an indication indicating whether the SCST is available. The indication is generated by the third device 130 and transmitted to the first device 110. Of course, any other suitable information related to the counter is also feasible. In these embodiments, the first device 110 may determine that the SCST is available if the indication indicates that the SCST is available, and determine that the SCST is unavailable if the indication indicates that the SCST is unavailable.

If determining that the SCST is available, the first device 110 transmits 250 the control signaling to the second device 120 on a SCST resource configured for the SCST. If determining that the SCST is unavailable, the first device 110 does not transmit the control signaling in current slot and waits for next slot with a SCST resource.

In this way, a SCST can be applied for sidelink control signaling transmission in an unlicensed spectrum and thus a reliable transmission of a sidelink control signaling can be achieved. For illustration, more detailed processes will be described in connection with Embodiments 1 and 2.

Embodiment 1

In this embodiment, the counter is maintained by the first device 110. This will be described with reference to FIG. 3.

Figure 3:
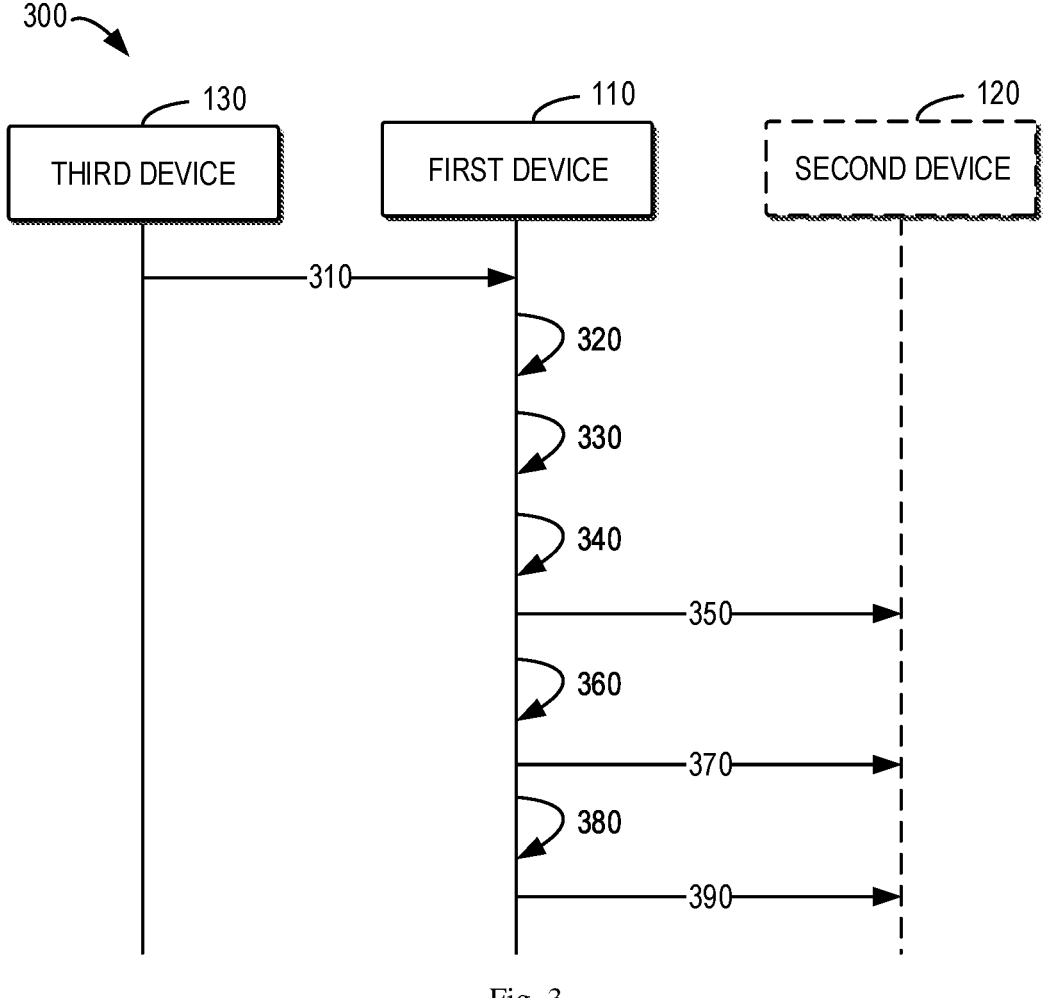
FIG. 3 illustrates a flowchart illustrating another process for a SCST for a sidelink communication in an unlicensed spectrum according to some embodiments of the present disclosure.

FIG. 3 illustrates a flowchart illustrating another process 300 of a SCST for a sidelink communication in an unlicensed spectrum according to some embodiments of the present disclosure. For the purpose of discussion, the process 300 will be described with reference to FIG. 1. The process 300 may involve the first, second and third devices 110, 120 and 130 as illustrated in FIG. 1. It would be appreciated that although the process 300 has been described in the communication network 100 of FIG. 1, this process may be likewise applied to other communication scenarios where different network devices are jointly deployed to provide respective serving cells.

As shown in FIG. 3, the third device 130 may transmit 310 a configuration concerning a SCST to the first device 110. The configuration may comprise first information indicating the SCST resource, second information indicating the usage of the SCST resource and third information indicating the counter. More details of the first to third information are similar with that described above, and thus are not repeated here for concise. Accordingly, the first device 110 may maintain the counter based on the configuration.

In operation, the first device 110 may determine 320 whether a control signaling is to be transmitted to the second device 120 via a SCST. If determining that the control signaling is to be transmitted via the SCST, the first device 110 may determine 330 whether the first symbol occupied by a normal resource available for the transmission of the control signaling is identical with that occupied by the SCST resource. The normal resource requires a LBT procedure for channel access. If determining that the first symbol occupied by the normal resource is different from that occupied by the SCST resource, the first device 110 may determine 340 whether the SCST is available.

In some embodiments, the first device 110 may determine whether the SCST is available by determining whether a value of the counter is lower than a threshold value. In some embodiments, the threshold value may be configured by the third device 130. In some embodiments, the threshold value may be determined by the first device 110 based on the above equation (1). Of course, any other suitable ways are also feasible for determining the threshold value. In some embodiments, the first device 110 may determine that the SCST is available if the value of the counter is lower than the threshold value, and determine that the SCST is unavailable if the value of the counter is equal to or higher than the threshold value.

If determining that the SCST is available, the first device 110 may transmit 350 the control signaling to the second device 120 on a SCST resource configured for the SCST. If determining that the SCST is unavailable, the first device 110 does not transmit the control signaling in current slot and waits for next slot with a SCST resource.

If determining that the first symbol occupied by the second resource is identical with that occupied by the first resource, the first device 110 may perform 360 the LBT procedure. For example, the first device 110 may perform the LBT procedure before the first symbol in a slot (e.g., 25 μs clear channel assessment (CCA) in the guard symbol).

If the LBT procedure succeeds, the first device 110 may transmit 370 the control signaling to the second device 120 on the normal resource, instead of using the SCST.

If the LBT procedure fails, the first device 110 may determine 380 whether the SCST is available, as described in connection with the determination 340. If determining that the SCST is available, the first device 110 may transmit 390 the control signaling to the second device 120 on a SCST resource configured for the SCST. If determining that the SCST is unavailable, the first device 110 does not transmit the control signaling in current slot and waits for next slot with a SCST resource.

As to the maintenance of the counter, in some embodiments, the first device 110 may reset the counter at the beginning of a configured period for SCST. For example, the first device 110 may reset the counter as zero. Of course, this is merely an example, and the counter may be reset as any other suitable values. In this way, the counter can count for the number of SCST within the configured period.

In some embodiments, in response to the transmission of the control signaling on the SCST resource, the first device 110 may increment the value of the counter. For example, the first device 110 may increase the value of the counter by one. Of course, any other suitable incrementation is also feasible. In this way, the SCST can be strictly counted and then the constraints for the usage of the SCST can be accurately satisfied.

In some embodiments, if determining that no control signaling is to be transmitted via the SCST, the first device 110 may determine whether a value of the counter is lower than the threshold value. If determining that the value of the counter is lower than the threshold value, the first device 110 may determine whether the SCST is being performed on the SCST resource.

In some embodiments, the first device 110 may perform at least one of energy detection or sequence detection so as to determine whether the SCST is being performed on the SCST resource. In some alternative embodiments, the first device 110 may perform control packet decoding so as to determine whether the SCST is being performed on the SCST resource. In some alternative embodiments, if receiving a short control signaling for itself, the first device 110 may determine that the SCST is being performed on the SCST resource. In some alternative embodiments, the first device 110 may perform a LBT procedure before the SCST resource, and if the LBT fails, the first device 110 may determine that the SCST is being performed on the SCST resource. In some alternative embodiments, the first device 110 may perform a LBT procedure before the SCST resource, and if the LBT fails and the first device 110 identified that there are other UEs to transmit at the SCST resource, the first device 110 may determine that the SCST is being performed on the SCST resource.

If determining that the SCST is being performed on the SCST resource, the first device 110 may increment the value of the counter. In this way, the SCST also can be strictly counted and then the constraints for the usage of the SCST can be accurately satisfied.

Embodiment 2

In this embodiment, the counter is maintained by the third device 130. This will be described with reference to FIG. 4.

Figure 4:
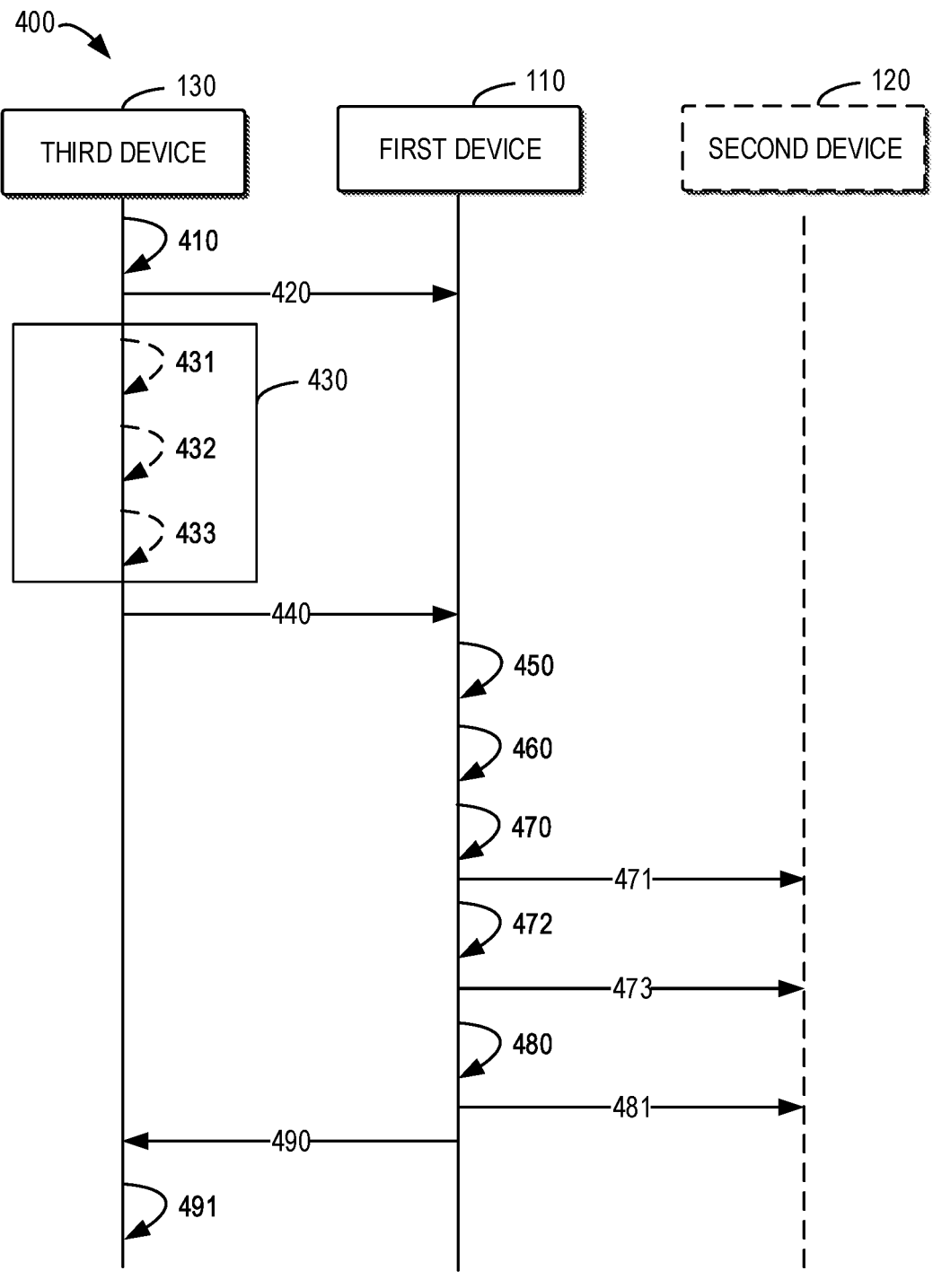
FIG. 4 illustrates a flowchart illustrating another process for a SCST for a sidelink communication in an unlicensed spectrum according to some embodiments of the present disclosure.

FIG. 4 illustrates a flowchart illustrating another process 400 of a SCST for a sidelink communication in an unlicensed spectrum according to some embodiments of the present disclosure. For the purpose of discussion, the process 400 will be described with reference to FIG. 1. The process 400 may involve the first, second and third devices 110, 120 and 130 as illustrated in FIG. 1. It would be appreciated that although the process 400 has been described in the communication network 100 of FIG. 1, this process may be likewise applied to other communication scenarios where different network devices are jointly deployed to provide respective serving cells.

As shown in FIG. 4, the third device 130 may maintain 410 a counter for counting occasions within a period for a SCST. The third device 130 may transmit 420 a configuration concerning the SCST to the first device 110. Here, the configuration may comprise first information indicating the SCST resource and second information indicating the usage of the SCST resource. More details of the first and second information are similar with that described above, and thus are not repeated here for concise.

In operation, the third device 130 may generate 430, based on the counter, an indication indicating whether the SCST is available. As shown in FIG. 3, the third device 130 may determine 431 whether a value of the counter is lower than the threshold value. If determining that the value of the counter is lower than the threshold value, the third device 130 may generate 432, as the indication, a first indication indicating that the SCST is available. If determining that the value of the counter is equal to or higher than the threshold value, the third device 130 may generate 433, as the indication, a second indication indicating that the SCST is unavailable.

Upon generation of the indication, the third device 130 may transmit 440 the indication to the first device 110. In some embodiments, the third device 130 may transmit the indication to the first device 110 only when the indication changes. For example, when the indication changes from the first indication to the second indication or the indication changes from the second indication to the first indication, the third device 130 may transmit the indication to the first device 110. In this way, signaling overhead may be significantly reduced.

The first device 110 may determine 450 whether a control signaling is to be transmitted to the second device 120 via a SCST. If determining that the control signaling is to be transmitted via the SCST, the first device 110 may determine 460 whether the first symbol occupied by a normal resource available for the transmission of the control signaling is identical with that occupied by the SCST resource. The normal resource requires a LBT procedure for channel access. If determining that the first symbol occupied by the second resource is identical with that occupied by the first resource, the first device 110 may perform 470 the LBT procedure.

If the LBT procedure succeeds, the first device 110 may transmit 471 the control signaling to the second device 120 on the normal resource, instead of using the SCST. If the LBT procedure fails, the first device 110 may determine 472 whether the SCST is available based on the indication received from the third device 130. If determining that the SCST is available, the first device 110 may transmit 473 the control signaling to the second device 120 on a SCST resource configured for the SCST. If determining that the SCST is unavailable, the first device 110 does not transmit the control signaling in current slot and waits for next slot with a SCST resource.

If determining that the first symbol occupied by the normal resource is different from that occupied by the SCST resource, the first device 110 may determine 480 whether the SCST is available based on the indication received from the third device 130. If determining that the SCST is available, the first device 110 may transmit 481 the control signaling to the second device 120 on a SCST resource configured for the SCST. If determining that the SCST is unavailable, the first device 110 does not transmit the control signaling in current slot and waits for next slot with a SCST resource.

As to the maintenance of the counter, in some embodiments, the third device 130 may reset the counter at the beginning of a configured period for SCST. For example, the third device 130 may reset the counter as zero. Of course, this is merely an example, and the counter may be reset as any other suitable values. In this way, the counter can count for the number of SCST within the configured period.

In some embodiments, in response to the transmission of the control signaling on the SCST resource, the first device 110 may transmit 490, to the third device 130, a report indicating the transmission of the control signaling on the SCST resource. Upon receipt of the report, the third device 130 may increment 491 the value of the counter. For example, the third device 130 may increase the value of the counter by one. Of course, any other suitable incrementation is also feasible. In this way, the SCST can be counted and then the constraints for the usage of the SCST can be satisfied.

In some embodiments, if determining that a further report indicating the transmission of the control signaling on the SCST resource at the same occasion is received from a further device (another first device, not shown), the third device 130 may not increment the value of the counter. That is, the third device 130 only increments the value of the counter by 1 when a plurality of first devices report that they have carried out SCST at the same occasion.

It is to be noted that the processes 200A, 300 and 400 as shown in FIGS. 2A, 3 and 4 are merely examples, and may have additional or less operations.

Example Implementation of Methods

Figure 5:
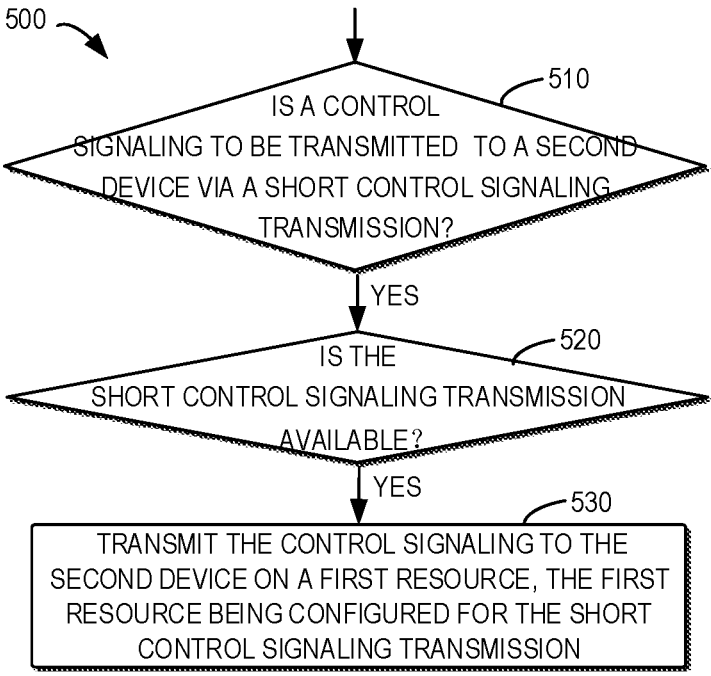
FIG. 5 illustrates a flowchart of a method implemented at a first device according to some embodiments of the present disclosure.

Corresponding to the above processes, example embodiments of the present disclosure also provide methods of communication. FIG. 5 illustrates a flowchart of a method 500 implemented at a first device according to some embodiments of the present disclosure. For the purpose of discussion, the method 500 will be described from the perspective of the first device 110 with reference to FIG. 1.

At block 510, the first device 110 determines whether a control signaling is to be transmitted to the second device

120 via a SCST. If determining that the control signaling is to be transmitted via the SCST, the process proceeds to block 520.

At block 520, the first device 110 determines whether the SCST is available based on at least information related to a counter. The counter is set for counting occasions within a period for the SCST at a sidelink interface.

At block 530, if determining that the SCST is available, the first device 110 transmits the control signaling to the second device on a first resource configured for the SCST.

In this way, constraints for the usage of the SCST can be satisfied and a reliable transmission of a sidelink control signaling in an unlicensed spectrum can be realized. More detailed embodiments will be described below in connection with FIGS. 6 and 7.

FIG. 6 illustrates a flowchart of another method 600 implemented at a first device according to some embodiments of the present disclosure. For the purpose of discussion, the method 600 will be described from the perspective of the first device 110 with reference to FIG. 1. In this embodiment, a counter is maintained by the first device 110 for counting occasions within a period for a SCST at a sidelink interface.

At block 601, the first device 110 may determine whether it is in a new period for a SCST currently. If it is in a new period, at block 602, the first device 110 may reset the counter.

At block 603, the first device 110 may determine whether a control signaling is to be transmitted to the second device 120 via a SCST. If determining that the control signaling is to be transmitted, the process proceeds to block 604.

At block 604, the first device 110 may determine whether the first symbol occupied by a second resource available for the transmission of the control signaling is identical with that occupied by a first resource, the second resource requiring a LBT procedure for channel access, and the first resource being configured for the SCST. If determining that the first symbol occupied by the first resource is identical with that occupied by the second resource, the process proceeds to block 605.

At block 605, the first device 110 may perform a LBT procedure. If determining at block 606 that the LBT procedure succeeds, the process proceeds to block 607. At block 607, the first device 110 may transmit the control signaling to the second device 120 on the second resource. Then the process proceeds to block 611.

If determining at block 606 that the LBT procedure fails, the process proceeds to block 608. If determining at block 604 that the first symbol occupied by the second resource is different from that occupied by the first resource, the process also proceeds to block 608.

At block 608, the first device 110 may determine whether a value of the counter is lower than a threshold value. If the value of the counter is lower than the threshold value, at block 609, the first device 110 may transmit the control signaling to the second device 120 on the first resource. At block 610, the first device 110 may increment the value of the counter. Then the process proceeds to block 611. If determining, at block 608, that the value of the counter is equal to or higher than the threshold value, the process also proceeds to block 611. At block 611, the first device 110 may wait for next slot with the first resource.

If determining at block 603 that no control signaling to be transmitted via SCST, the first device 110 may determine at block 612 whether a value of the counter is lower than the threshold value. If determining that the value of the counter is lower than the threshold value, the first device 110 may determine at block 613 whether the SCST is being performed on the first resource. In some embodiments, the first device 110 may perform an energy detection on the first resource. In some embodiments, the first device 110 may perform a sequence detection on the first resource. In this way, the first device 110 can determine whether the SCST is being performed on the first resource.

Of course, any other suitable ways are also feasible to determine whether the SCST is being performed on the first resource. For example, the first device 110 may perform control packet decoding so as to determine whether the SCST is being performed on the SCST resource. In some alternative embodiments, if receiving a short control signaling for itself, the first device 110 may determine that the SCST is being performed on the SCST resource. In some alternative embodiments, the first device 110 may perform a LBT procedure before the SCST resource, and if the LBT fails, the first device 110 may determine that the SCST is being performed on the SCST resource. In some alternative embodiments, the first device 110 may perform a LBT procedure before the SCST resource, and if the LBT fails and the first device 110 identified that there are other UEs to transmit at the SCST resource, the first device 110 may determine that the SCST is being performed on the SCST resource.

If determining that the SCST is being performed on the first resource, at block 614, the first device 110 may increment the value of the counter. Then the process proceeds to block 611. If determining, at block 612, that the value of the counter is equal to or higher than the threshold value, the process also proceeds to block 611. At block 611, the first device 110 may wait for next slot with the first resource.

With the method 600, constraints for the usage of the SCST can be satisfied and a reliable transmission of a sidelink control signaling in an unlicensed spectrum can be realized.

Figure 7:
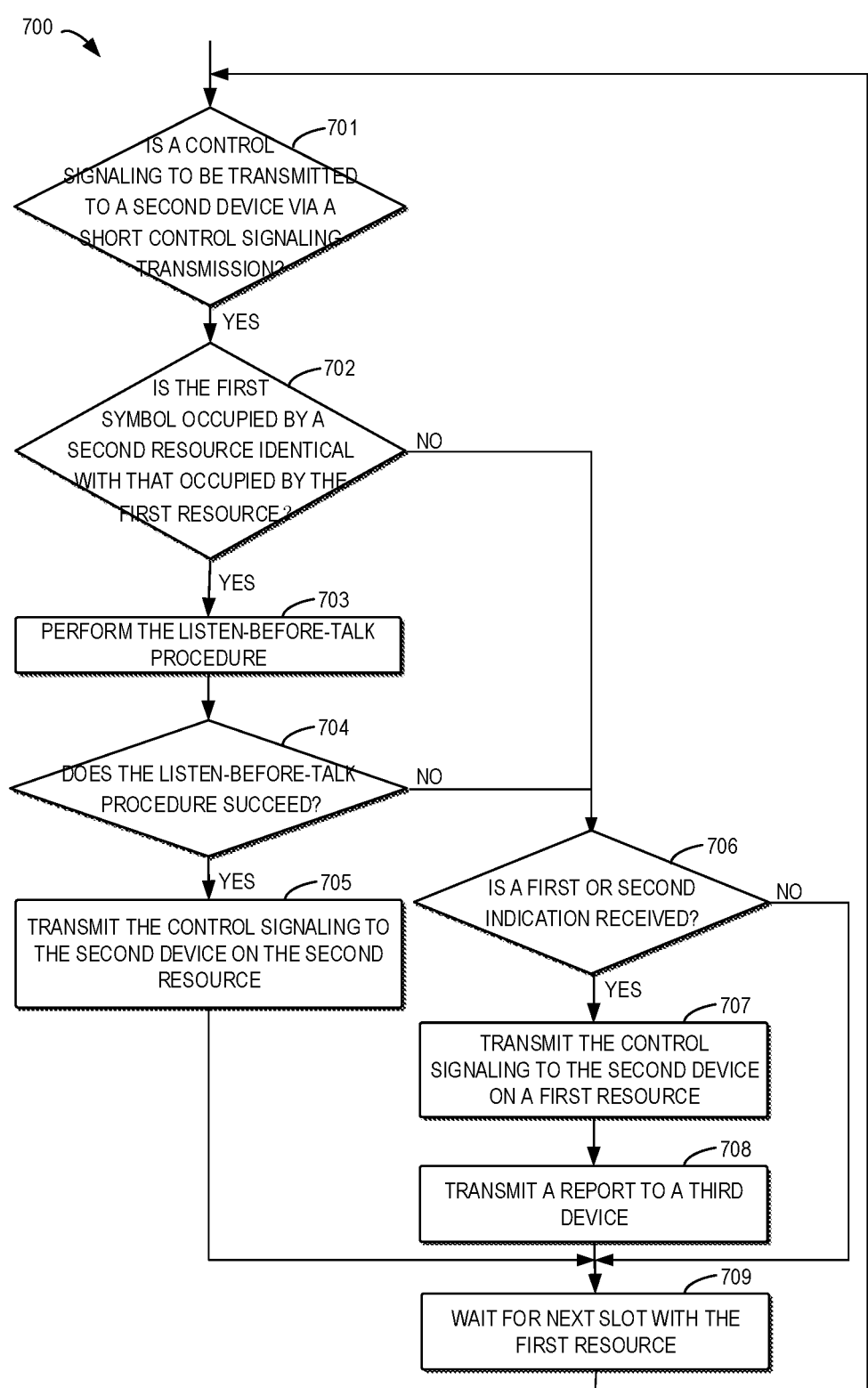
FIG. 7 illustrates a flowchart of another method implemented at a first device according to some embodiments of the present disclosure.

FIG. 7 illustrates a flowchart of another method 700 implemented at a first device according to some embodiments of the present disclosure. For the purpose of discussion, the method 700 will be described from the perspective of the first device 110 with reference to FIG. 1. In this embodiment, a counter is maintained by the third device 130 for counting occasions within a period for a SCST at a sidelink interface.

At block 701, the first device 110 may determine whether a control signaling is to be transmitted to the second device 120 via a SCST. If determining that the control signaling is to be transmitted, the process proceeds to block 702. If determining that no control signaling is to be transmitted, the first device 110 does not perform any action.

At block 702, the first device 110 may determine whether the first symbol occupied by a second resource available for the transmission of the control signaling is identical with that occupied by a first resource, the second resource requiring a LBT procedure for channel access, and the first resource being configured for the SCST. If determining that the first symbol occupied by the first resource is identical with that occupied by the second resource, the process proceeds to block 703.

At block 703, the first device 110 may perform a LBT procedure. If determining at block 704 that the LBT procedure succeeds, the process proceeds to block 705. At block 705, the first device 110 may transmit the control signaling to the second device 120 on the second resource. Then the process proceeds to block 709.

If determining at block 704 that the LBT procedure fails, the process proceeds to block 706. At block 706, the first device 110 may determine whether a first or second indication is received, the first indication indicating that the SCST is available and the second indication indicating that the SCST is unavailable. If determining at block 706 that the first indication is received, the process proceeds to block 707.

At block 707, the first device 110 may transmit the control signaling to the second device 120 on the first resource. At block 708, the first device 110 may transmit to the third device 130 a report indicating the transmission of the control signaling on the first resource. Then the process proceeds to block 709.

If determining at block 706 that the second indication is received, the process also proceeds to block 709. At block 709, the first device 110 may wait for next slot with the first resource.

With the method 700, constraints for the usage of the SCST can also be satisfied and a reliable transmission of a sidelink control signaling in an unlicensed spectrum can be realized.

FIG. 8 illustrates a flowchart of a method 800 implemented at a third device according to some embodiments of the present disclosure. For the purpose of discussion, the method 800 will be described from the perspective of the third device 130 with reference to FIG. 1. In this embodiment, a counter may be maintained by the third device 130 for counting occasions within a period for a SCST at a sidelink interface.

At block 810, the third device 130 generates, based on a counter, an indication indicating whether a SCST is available. The counter is set for counting occasions within a period for the SCST at a sidelink interface.

In some embodiments, the third device 130 may determine whether a value of the counter is lower than a threshold value. If determining that the value of the counter is lower than the threshold value, the third device 130 may generate, as the indication, a first indication indicating that the SCST is available. If determining that the value of the counter is equal to or higher than the threshold value, the third device 130 may generate, as the indication, a second indication indicating that the SCST is unavailable.

At block 820, the third device 130 transmits the indication to the first device 110. In some embodiments, the third device 130 may transmit the indication to the first device 110 only when the indication changes. For example, when the indication changes from the first indication to the second indication or the indication changes from the second indication to the first indication, the third device 130 may transmit the indication to the first device 110. In this way, signaling overhead may be significantly reduced.

In some embodiments, the third device 130 may generate a configuration concerning a SCST and transmit the configuration to the first device 110. In some embodiments, the configuration may comprise at least one of first information indicating a first resource configured for the SCST and second information indicating a usage of the first resource.

In some embodiments, the third device 130 may reset the counter at the beginning of a period configured for the SCST. In some embodiments, the third device 130 may receive, from the first device 110, a report indicating a transmission of a control signaling on a first resource configured for the SCST. Upon receipt of the report, the third device 130 may increment a value of the counter. In some embodiments, if determining that a further report indicating the transmission of the control signaling on the first resource at the same occasion is received from a further device, the third device 130 may not increment the value of the counter.

In this way, the counter can be efficiently maintained and thus the use of the SCST in sidelink communication can be facilitated.

FIG. 9 illustrates a flowchart of a method 900 implemented at a third device according to some embodiments of the present disclosure. For the purpose of discussion, the method 900 will be described from the perspective of the third device 130 with reference to FIG. 1. In this embodiment, a counter may be maintained by the first device 110 for counting occasions within a period for a SCST at a sidelink interface.

At block 910, the third device 130 generates a configuration concerning a SCST. In some embodiments, the configuration may comprise at least one of the following: first information indicating a first resource, the first resource being configured for the SCST; second information indicating the usage of the first resource; or third information indicating a counter, the counter being used for counting occasions within a period for the SCST at a sidelink interface.

In some embodiments, the first information may comprise at least one of the following: a time or frequency location of the first resource, or a granularity of the first resource. In some embodiments, the second information may comprise a mapping between a data channel and the first resource. In some embodiments, the third information may comprise at least one of the following: a length of the period, a starting slot of the period, or a threshold value for the number of the occasions in the period.

At block 920, the third device 130 transmits the configuration to the first device 110. In this way, a counter can be configured for counting occasions within a period for a SCST at a sidelink interface, and the constraints on the usage of the SCST can be satisfied.

It is to be noted that the operations of the methods 500-900 correspond to that of the processes 200A, 300 and 400 described above, and thus other details are not repeated here for concise.

Example Implementation of Apparatus and Devices

Example embodiments of the present disclosure also provide the corresponding apparatus. In some embodiments, an apparatus (for example, the first device 110) capable of performing any of the methods 500-700 may comprise means for performing the respective steps of the methods 500-700. The means may be implemented in any suitable form. For example, the means may be implemented in a circuitry or software module.

In some embodiments, the apparatus comprises means for determining, at a first device, whether the SCST is available based on at least information related to a counter in accordance with a determination that a control signaling is to be transmitted to a second device via a SCST, the counter being used for counting occasions within a period for the SCST at a sidelink interface; and means for transmitting the control signaling to the second device on a first resource in accordance with a determination that the SCST is available, the first resource being configured for the SCST.

In some embodiments, the means for determining whether the SCST is available may comprise means for determining whether the first symbol occupied by a second resource available for the transmission of the control signaling is identical with that occupied by the first resource, the second resource requiring a listen-before-talk procedure for channel access; means for determining whether the SCST is available in accordance with a determination that the first symbol occupied by the first resource is different from that occupied by the second resource; and means for performing the listen-before-talk procedure in accordance with a determination that the first symbol occupied by the second resource is identical with that occupied by the first resource; and means for determining whether the SCST is available in accordance with a determination that the listen-before-talk procedure fails. In these embodiments, the apparatus may further comprise means for transmitting the control signaling to the second device on the second resource in accordance with a determination that the listen-before-talk procedure succeeds.

In some embodiments, the apparatus may further comprise means for receiving, from a third device serving the first device, a configuration concerning the SCST, the configuration comprising at least one of the following: first information indicating the first resource, second information indicating the usage of the first resource, or third information indicating the counter. In some embodiments, the first information may comprise at least one of the following: a time or frequency location of the first resource, or a granularity of the first resource. In some embodiments, the second information may comprise a mapping between a data channel and the first resource. In some embodiments, the third information may comprise at least one of the following: a length of the period, a starting slot of the period, or a threshold value for the number of the occasions in the period.

In some embodiments, the means for determining whether the SCST is available may comprise means for determining whether a value of the counter is lower than a threshold value; means for determining that the SCST is available in accordance with a determination that the value of the counter is lower than the threshold value; and means for determining that the SCST is unavailable in accordance with a determination that the value of the counter is equal to or higher than the threshold value.

In some embodiments, the apparatus may further comprise means for incrementing a value of the counter in response to the transmission of the control signaling on the first resource. In some embodiments, the apparatus may further comprise means for determining whether a value of the counter is lower than a threshold value in accordance with a determination that no control signaling is to be transmitted via the SCST; means for determining whether the SCST is being performed on the first resource in accordance with a determination that the value of the counter is lower than the threshold value; and means for incrementing the value of the counter in accordance with a determination that the SCST is being performed on the first resource. In some embodiments, the apparatus may further comprise means for resetting the counter at the beginning of the period for the SCST.

In some embodiments, the means for determining whether the SCST is available may comprise means for receiving, from a third device serving the first device, an indication indicating whether the SCST is available, the indication being generated by the third device based on the counter; means for determining that the SCST is available in accordance with a determination that the indication is a first indication indicating that the SCST is available; and means for determining that the SCST is unavailable in accordance with a determination that the indication is a second indication indicating that the SCST is unavailable.

In some embodiments, the apparatus may further comprise means for transmitting, to a third device serving the first device, a report indicating the transmission of the control signaling on the first resource. In some embodiments, the first and second devices are terminal devices, and the third device is a network device.

In some embodiments, an apparatus (for example, the third device 130) capable of performing the method 800 may comprise means for performing the respective steps of the method 800. The means may be implemented in any suitable form. For example, the means may be implemented in a circuitry or software module.

In some embodiments, the apparatus comprises: means for generating, based on a counter, an indication indicating whether a SCST is available, the counter being used for counting occasions within a period for the SCST at a sidelink interface; and means for transmitting the indication to a first device served by the third device. In some embodiments, the apparatus may further comprise means for receiving, from the first device, a report indicating a transmission of a control signaling on a first resource, the first resource being configured for the SCST; and means for incrementing a value of the counter.

In some embodiments, an apparatus (for example, the third device 130) capable of performing the method 900 may comprise means for performing the respective steps of the method 900. The means may be implemented in any suitable form. For example, the means may be implemented in a circuitry or software module.

In some embodiments, the apparatus comprises: means for generating a configuration concerning a SCST, the configuration comprising at least one of the following: first information indicating a first resource, the first resource being configured for the SCST, second information indicating the usage of the first resource, or third information indicating a counter, the counter being used for counting occasions within a period for the SCST at a sidelink interface; and means for transmitting the configuration to a first device served by the third device.

In some embodiments, the first information may comprise at least one of the following: a time or frequency location of the first resource, or a granularity of the first resource. In some embodiments, the second information may comprise a mapping between a data channel and the first resource. In some embodiments, the third information may comprise at least one of the following: a length of the period, a starting slot of the period, or a threshold value for the number of the occasions in the period.

In some embodiments, the means comprises at least one processor; and at least one memory including computer program code, the at least one memory and computer program code configured to, with the at least one processor, cause the performance of the apparatus.

FIG. 10 is a simplified block diagram of a device 1000 that is suitable for implementing embodiments of the present disclosure. The device 1000 may be provided to implement the communication device, for example the first device 110, the second device 120 or the third device 130 as shown in FIG. 1. As shown, the device 1000 includes one or more processors 1010, one or more memories 1020 coupled to the processor 1010, and one or more communication modules 1040 coupled to the processor 1010.

The communication module 1040 is for bidirectional communications. The communication module 1040 has at least one antenna to facilitate communication. The communication interface may represent any interface that is necessary for communication with other network elements.

The processor 1010 may be of any type suitable to the local technical network and may include one or more of the following: general purpose computers, special purpose computers, microprocessors, digital signal processors (DSPs) and processors based on multicore processor architecture, as non-limiting examples. The device 1000 may have multiple processors, such as an application specific integrated circuit chip that is slaved in time to a clock which synchronizes the main processor.

The memory 1020 may include one or more non-volatile memories and one or more volatile memories. Examples of the non-volatile memories include, but are not limited to, a Read Only Memory (ROM) 1024, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 1022 and other volatile memories that will not last in the power-down duration.

A computer program 1030 includes computer executable instructions that are executed by the associated processor 1010. The program 1030 may be stored in the ROM 1020. The processor 1010 may perform any suitable actions and processing by loading the program 1030 into the RAM 1020.

The embodiments of the present disclosure may be implemented by means of the program 1030 so that the device 1000 may perform any process of the disclosure as discussed with reference to FIGS. 2A to 9. The embodiments of the present disclosure may also be implemented by hardware or by a combination of software and hardware.

Figure 11:
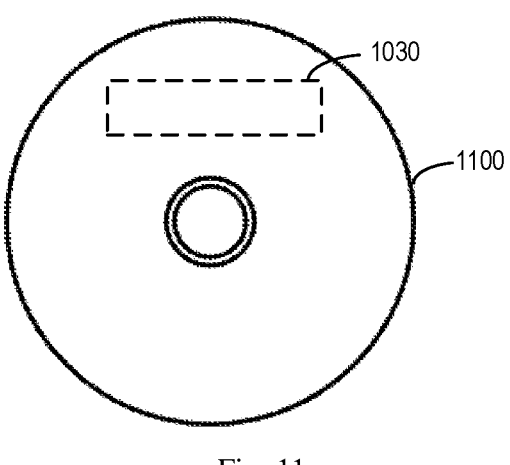
FIG. 11 illustrates a block diagram of an example computer readable medium in accordance with some embodiments of the present disclosure.

In some embodiments, the program 1030 may be tangibly contained in a computer readable medium which may be included in the device 1000 (such as in the memory 1020) or other storage devices that are accessible by the device 1000. The device 1200 may load the program 1030 from the computer readable medium to the RAM 1022 for execution. The computer readable medium may include any types of tangible non-volatile storage, such as ROM, EPROM, a flash memory, a hard disk, CD, DVD, and the like. FIG. 11 shows an example of the computer readable medium 1100 in form of CD or DVD. The computer readable medium has the program 1030 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the method 500, 600, 700, 800 or 900 as described above with reference to FIGS. 5-9. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A first device comprising:
at least one processor; and
at least one memory storing instructions that, when executed by the at least one processor, cause the first device at least to:
  in accordance with a determination that a control signaling is to be transmitted to a second device via a short control signaling transmission, determine whether the short control signaling transmission is available based on at least information related to a counter, the counter being used for counting occasions within a period for the short control signaling transmission at a sidelink interface; and
  in accordance with a determination that the short control signaling transmission is available, transmit the control signaling to the second device on a first resource, the first resource being configured for the short control signaling transmission.

2. The first device of claim 1, wherein the first device is caused to determine whether the short control signaling transmission is available by:
  determining whether the first symbol occupied by a second resource available for the transmission of the control signaling is identical with that occupied by the first resource, the second resource requiring a listen-before-talk procedure for channel access;
  in accordance with a determination that the first symbol occupied by the first resource is different from that occupied by the second resource, determining whether the short control signaling transmission is available; and
  in accordance with a determination that the first symbol occupied by the second resource is identical with that occupied by the first resource,
    performing the listen-before-talk procedure; and
    in accordance with a determination that the listen-before-talk procedure fails, determining whether the short control signaling transmission is available.

3. The first device of claim 2, wherein the first device is further caused to:
  in accordance with a determination that the listen-before-talk procedure succeeds, transmit the control signaling to the second device on the second resource.

4. The first device of claim 1, wherein the first device is further caused to:
  receive, from a third device serving the first device, a configuration concerning the short control signaling transmission, the configuration comprising at least one of the following:
  first information indicating the first resource,
  second information indicating the usage of the first resource, or
  third information indicating the counter.

5. The first device of claim 4, wherein the first information comprises at least one of the following:
  at least one of a time or frequency location of the first resource, or
  a granularity of the first resource.

6. The first device of claim 4, wherein the second information comprises a mapping between a data channel and the first resource.

7. The first device of claim 4, wherein the third information comprises at least one of the following:
  a length of the period,
  a starting slot of the period, or
  a threshold value for the number of the occasions in the period.

8. The first device of claim 1, wherein the first device is caused to determine whether the short control signaling transmission is available by:
  determining whether a value of the counter is lower than a threshold value;

US 12,568,495 B2

23 in accordance with a determination that the value of the
counter is lower than the threshold value, determining
that the short control signaling transmission is avail-
able; and
in accordance with a determination that the value of the
counter is equal to or higher than the threshold value,
determining that the short control signaling transmis-
sion is unavailable.
9. The first device of claim 1, wherein the first device is
further caused to:
in response to the transmission of the control signaling on
the first resource, increment a value of the counter.
10. The first device of claim 1, wherein the first device is
further caused to:
in accordance with a determination that no control sig-
naling is to be transmitted via the short control signal-
ing transmission, determine whether a value of the
counter is lower than a threshold value;
in accordance with a determination that the value of the
counter is lower than the threshold value, determine,
based on at least one of energy detection or sequence
detection, whether the short control signaling transmis-
sion is being performed on the first resource; and
in accordance with a determination that the short control
signaling transmission is being performed on the first
resource, increment the value of the counter.
11. The first device of claim 1, wherein the first device is
further caused to:
reset the counter at the beginning of the period for the
short control signaling transmission.
12. The first device of claim 1, wherein the first device is
caused to determine whether the short control signaling
transmission is available by:
receiving, from a third device serving the first device, an
indication indicating whether the short control signal-
ing transmission is available, the indication being gen-
erated by the third device based on the counter;
in accordance with a determination that the indication is
a first indication indicating that the short control sig-
naling transmission is available, determining that the
short control signaling transmission is available; and
in accordance with a determination that the indication is
a second indication indicating that the short control
signaling transmission is unavailable, determining that
the short control signaling transmission is unavailable.
13. The first device of claim 1, wherein the first device is
further caused to:
transmit, to a third device serving the first device, a report
indicating the transmission of the control signaling on
the first resource.
14. The first device of claim 13, wherein the first and
second devices are terminal devices, and the third device is
a network device.

24

15. A third device comprising:
at least one processor; and
at least one memory storing instructions that, when
executed by the at least one processor, cause the third
device at least to:
generate, based on a counter, an indication indicating
whether a short control signaling transmission is
available, the counter being used for counting occa-
sions within a period for the short control signaling
transmission at a sidelink interface; and
transmit the indication to a first device served by the
third device.
16. The third device of claim 15, wherein the third device
is further caused to:
receive, from the first device, a report indicating a trans-
mission of a control signaling on a first resource, the
first resource being configured for the short control
signaling transmission; and
increment a value of the counter.
17. A method comprising:
in accordance with a determination that a control signal-
ing is to be transmitted to a second device via a short
control signaling transmission, determining by a first
device whether the short control signaling transmission
is available based on at least information related to a
counter, the counter being used for counting occasions
within a period for the short control signaling trans-
mission at a sidelink interface; and
in accordance with a determination that the short control
signaling transmission is available, transmitting by the
first device the control signaling to the second device
on a first resource, the first resource being configured
for the short control signaling transmission.
18. The method of claim 17, further comprising:
receiving, by the first device from a third device serving
the first device, a configuration concerning the short
control signaling transmission, the configuration com-
prising at least one of the following:
first information indicating the first resource,
second information indicating the usage of the first
resource, or
third information indicating the counter.
19. The method of claim 17, further comprising:
in response to the transmission of the control signaling on
the first resource, incrementing, by the first device, a
value of the counter.
20. The method of claim 17, further comprising:
resetting, by the first device, the counter at the beginning
of the period for the short control signaling transmis-
sion.

* * * * *